(12) United States Patent
Koller et al.

(10) Patent No.: US 6,595,218 B1
(45) Date of Patent: Jul. 22, 2003

(54) CIGARETTE FILTER

(75) Inventors: Kent B. Koller, Chesterfield, VA (US); Susan E. Wrenn, Chesterfield, VA (US); Willie G. Houck, Jr., Richmond, VA (US); John B. Paine, III, Midlothian, VA (US)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 09/868,068

(22) PCT Filed: Oct. 29, 1999

(86) PCT No.: PCT/US99/25490

§ 371 (c)(1),
(2), (4) Date: Jan. 28, 2002

(87) PCT Pub. No.: WO00/25611

PCT Pub. Date: May 11, 2000

Related U.S. Application Data

(63) Continuation-in-part of application No. 09/181,859, filed on Oct. 29, 1998, now Pat. No. 6,209,547.

(51) Int. Cl.[7] .......................... A24B 15/00; A24B 15/28
(52) U.S. Cl. ...................... 131/331; 131/332; 131/334; 493/47; 493/39; 423/228; 423/210; 423/245.1; 423/242.7
(58) Field of Search ................................ 131/331, 332, 131/334, 342, 200, 202; 423/228, 210, 245.1, 242.7; 493/47, 39

(56) References Cited

U.S. PATENT DOCUMENTS

| 2,815,760 A | 12/1957 | Schreus et al. |
| 2,815,761 A | 12/1957 | Shearer, Jr. |
| 2,881,772 A | 4/1959 | Touey et al. |
| 2,968,306 A | 1/1961 | Touey et al. |
| 3,003,504 A | 10/1961 | Touey et al. |
| 3,251,365 A | 5/1966 | Keith, II et al. |
| 3,338,249 A | 8/1967 | Erlenmeyer |
| 3,354,886 A | 11/1967 | Berger et al. |
| 3,658,070 A | 4/1972 | Diluzio |
| 3,662,765 A | 5/1972 | Clark |
| 3,716,063 A | 2/1973 | Litzinger |

(List continued on next page.)

FOREIGN PATENT DOCUMENTS

| DE | 34 47 445 | 8/1986 |
| EP | 0 121 436 | 10/1984 |
| JP | 63-63369 | 3/1988 |
| JP | 3-229605 | 10/1991 |
| JP | 6-58219 | 3/1994 |
| JP | 6-86804 | 3/1994 |
| JP | 6-209756 | 8/1994 |
| WO | WO 95/17105 | 6/1995 |
| WO | WO 95/47381 | 12/1997 |

Primary Examiner—Steven P. Griffin
Assistant Examiner—Dionne A. Walls
(74) Attorney, Agent, or Firm—Burns, Doane, Swecker & Mathis, LLP

(57) ABSTRACT

A cigarette filter having a reagent which chemically reacts with and removes a gaseous component of a smoke stream. The reagent contains functional groups covalently bonded to a non-volatile inorganic substrate which is incorporated in the filter. The filter can remove gaseous components such as aldehydes from tobacco smoke. Preferred functional groups are 3-aminopropylsilyl groups covalently bonded to silica gel (APS silica gel). The reagent can be contained in a space in the filter or incorporated in one or more filter elements such as tipping paper, shaped paper insert, mouthpiece plug, solid filter element, or free-flow filter element. The reagent can be part of or coated on paper such as tipping or filter paper or incorporated in non-paper filter elements formed from fibrous materials such as cellulose acetate or polypropylene fibers. Other preferred reagents include aminoethylaminopropylsilyl (AEAPS) silica gel and aminoethylaminoethylaminopropylsilyl (AEAEAPS) silica gel.

34 Claims, 9 Drawing Sheets

U.S. PATENT DOCUMENTS

| | | |
|---|---|---|
| 3,878,853 A | 4/1975 | Lipson |
| 4,033,361 A | 7/1977 | Horsewell et al. |
| 4,038,992 A | 8/1977 | Ogasa et al. |
| 4,059,119 A | 11/1977 | Grossman |
| 4,209,628 A | 6/1980 | Ikeda et al. |
| 4,300,577 A | 11/1981 | Horsewell et al. |
| 4,372,328 A | 2/1983 | Kausch et al. |
| 4,396,029 A | 8/1983 | Grossman |
| 4,466,451 A | 8/1984 | Bonnett et al. |
| 4,637,408 A | 1/1987 | Rainer et al. |
| 4,683,318 A | 7/1987 | Deffeves et al. |
| 4,724,242 A | 2/1988 | Vassileff |
| 4,892,719 A | 1/1990 | Gesser |
| 5,009,239 A | 4/1991 | Cohen et al. |
| 5,012,828 A | 5/1991 | Hayes et al. |
| 5,060,672 A | 10/1991 | Irimi et al. |
| 5,083,579 A | 1/1992 | Vanin et al. |
| 5,115,823 A | 5/1992 | Keritsis |
| 5,115,824 A | 5/1992 | Marshall |
| 5,409,021 A | 4/1995 | Safaev et al. |
| 5,692,525 A | 12/1997 | Counts et al. |
| 6,119,699 A | 9/2000 | Sung |
| 6,209,547 B1 * | 4/2001 | Koller et al. ............... 131/331 |

* cited by examiner

CIGARETTE FILTER

This is a 371 of PCT/US99/25490, filed on Oct. 29th, 1999, which in turn is a Continuation in Part of application Ser. No. 09/181,859, filed on Oct. 29th, 1998, now U.S. Pat. No. 6,209,547.

BACKGROUND OF THE INVENTION

1. Field of the Invention

This invention generally relates to a cigarette filter. More particularly, the invention relates to a cigarette filter that can selectively remove a gaseous component such as aldehydes from tobacco smoke.

2. Description of the Related Art

A wide variety of materials have been suggested in the art as filters for tobacco smoke. Such filter materials include cotton, paper, cellulose, and certain synthetic fibers. These filter materials, however, only remove particulates and condensable components from tobacco smoke. They have little or no effect in removing certain gaseous components, e.g., aldehydes, from tobacco smoke.

In light of this, a number of additives have been proposed in the art to supplement the performance of the filter materials. Exemplary additives are mentioned in, for example, U.S. Pat. Nos. 2,815,761; 2,881,772; 2,968,306; 3,003,504; and 3,354,886. Some of the additives known in the art are effective in removing certain amounts of gaseous components from tobacco smoke. However, those additives also suffer from various drawbacks.

For example, U.S. Pat. No. 2,968,306 discloses the use of certain amino acids, such as glycine, for removing aldehydes in tobacco smoke. It has been discovered that while glycine can reduce the level of formaldehyde in tobacco smoke, it is not stable in the cigarette filter manufacturing process. Moreover, it releases ammonia odor during storage.

Thus, it is an object of the present invention to provide cigarette filter arrangements and, more particularly, cigarette filters that can selectively remove a gaseous component such as aldehydes from tobacco smoke without the drawbacks or disadvantages associated with previously known additives.

SUMMARY OF THE INVENTION

It has been surprisingly discovered that a reagent comprising at least one reactive functional group covalently bonded to a non-volatile inorganic substrate is selective in removing a gaseous component such as aldehydes from tobacco smoke. It has also been surprisingly found that this system does not exhibit the drawbacks associated with additives known in the art. The reagent is preferably incorporated in a cigarette filter wherein the reactive functional group chemically reacts with a gaseous component of the smokestream to remove it from the smokestream.

The preferred functional group is an aminopropylsilyl group such as a 3-aminopropylsilyl group. The preferred substrate is in particle form, and more preferably is silica gel. The most preferred functional group/substrate arrangement (reagent) contains 3-aminopropylsilyl groups bonded to silica gel (hereinafter referred to as "APS silica gel"). This reagent can selectively remove gaseous components such as polar compounds (e.g., aldehydes and hydrogen cyanide) from tobacco smoke. Other preferred reagents include aminoethylaminopropylsilyl (AEAPS) silica gel and aminoethylaminoethyl aminopropylsilyl (AEAEAPS) silica gel.

A cigarette typically contains two sections, a tobacco-containing portion sometimes referred to as the tobacco or cigarette rod, and a filter portion which may be referred to as the filter tipping. The reagent can be advantageously employed along the filter portion of the cigarette. For example, the APS silica gel can be incorporated into the filter paper, i.e., paper located in the filter portion of the cigarette. The APS silica gel can also be incorporated into the fibers of the filter portion or formed into a filter plug incorporated in the filter portion and/or the tobacco rod.

DETAILED DESCRIPTION OF THE INVENTION

The invention provides a filter arrangement which is effective in removing a component of cigarette smoke by chemically reacting a reagent therewith. The reagent preferably comprises at least one reactive functional group. In order to prevent the reagent or its reaction product with the targeted cigarette smoke component from being carried into the cigarette smoke stream, the functional group is covalently bonded to an inorganic non-volatile substrate. Such an arrangement is advantageous over filter arrangements wherein gaseous components are absorbed, adsorbed, or otherwise non-chemically removed from a smoke stream. Such non-chemically removed components may be removed only temporarily and could reenter the smoke stream or if reacted with a volatile reagent, provide products that are themselves volatile and hence could reenter the smoke stream. According to the present invention, because the reactive functional group is covalently bonded to the substrate, once the gaseous component chemically reacts with the reagent, the removed component (and its reaction products) can be prevented from reentering the smoke stream.

The following explanation is presented in the context of the most preferred embodiment in which the reagent is APS silica gel. Without wishing to be bound by theory, it is believed that the APS silica gel contains primary amine groups. Under ordinary smoking conditions, the primary amine groups chemically react with and covalently bond to the aldehydes in tobacco smoke. The aldehydes are thus selectively removed from the tobacco smoke. Further, since the reactive functional groups and their resulting products from reaction with aldehydes are covalently bonded to the silica gel which is non-volatile, the mainstream tobacco smoke is essentially free of APS silica gel as well as the aldehydes which are bonded thereto.

Aldehydes in tobacco smoke that can be selectively removed by the reagent of the invention include, but are not limited to formaldehyde, acetaldehyde, acrolein, malonaldehyde, crotonaldehyde, etc.

In a first preferred embodiment, the reagent such as APS silica gel is incorporated into or onto a support such as paper (e.g., tipping paper) that is located along a filter portion of a cigarette. As will be recognized by persons skilled in the art, such paper can be used, for example, as a wrapper or a liner in the filter portion of the cigarette. The reagent such as APS silica gel can also be loaded onto a support such as lightly or tightly folded paper inserted into a hollow portion of the cigarette filter. The support is preferably in the form of a sheet material such as crepe paper, filter paper, or tipping paper. However, other suitable support materials such as organic or inorganic cigarette compatible materials can also be used.

Figure 1:
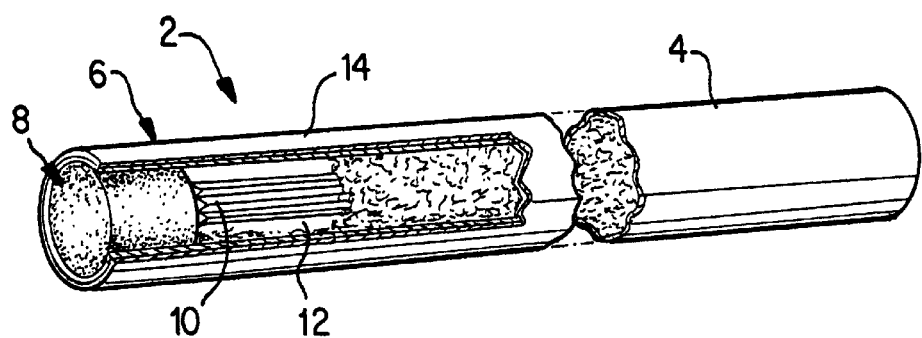
FIG. 1 is a perspective partially exploded view of a cigarette constructed in accordance with one embodiment of the present invention wherein folded paper containing a reagent which chemically reacts with a component of cigarette smoke is inserted into a hollow portion of a tubular filter element of the cigarette.

FIG. 1 illustrates a cigarette 2 having a tobacco rod 4, a filter portion 6, and a mouthpiece filter plug 8. As shown, the APS silica gel reagent can be loaded onto folded paper 10 inserted into a hollow cavity such as the interior of a free-flow sleeve 12 forming part of the filter portion 6.

Figure 2:
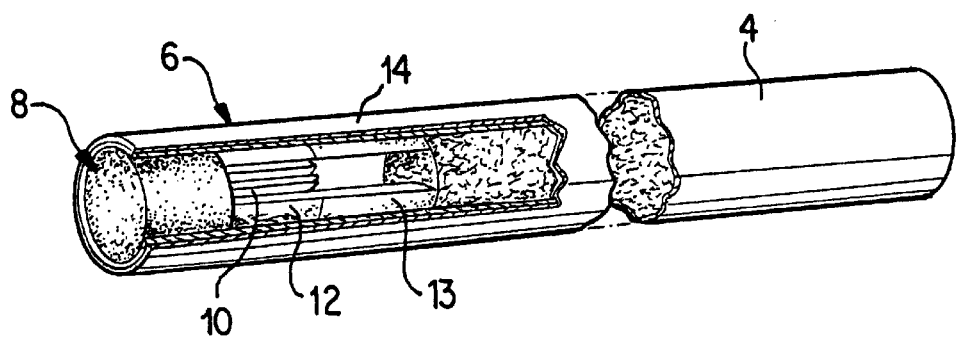
FIG. 2 is a perspective partially exploded view of another embodiment of the present invention wherein the reagent is incorporated in folded paper inserted into a hollow portion of a tubular filter element.

FIG. 2 shows a cigarette 2 having a tobacco rod 4 and a filter portion 6, wherein the folded paper 10 is located in the hollow cavity of a first free-flow sleeve 13 located between the mouthpiece filter 8 and a second free-flow sleeve 15. The paper 10 can be used in forms other than as a folded sheet. For instance, the paper 10 can be deployed as one or more individual strips, a wound roll, etc. In whichever form, a desired amount of reagent such as APS silica gel can be provided in the cigarette filter portion by a combination of the coated amount of reagent/area of the paper and/or the total area of coated paper employed in the filter (e.g., higher amounts of APS silica gel can be provided simply by using larger pieces of coated paper). In the cigarettes shown in FIGS. 1 and 2, the tobacco rod 4 and the filter portion 6 are joined together with tipping paper 14. In both cigarettes, the filter portion 6 may be held together by filter overwrap 11.

The reagent such as APS silica gel can be incorporated into the filter paper in a number of ways. For example, the APS silica gel can be mixed with water to form a slurry. The slurry can then be coated onto pre-formed filter paper and allowed to dry. The filter paper can then be incorporated into the filter portion of a cigarette in the manner shown in FIGS. 1 and 2. Alternatively, the dried paper can be wrapped into a plug shape and inserted into a filter portion of the cigarette. For example, the paper can be wrapped into a plug shape and inserted as a plug into the interior of a free-flow filter element such as a polypropylene or cellulose acetate sleeve. In another arrangement, the paper can comprise an inner liner of such a free-flow filter element.

Alternatively and more preferably, the reagent such as APS silica gel is added to the filter paper during the paper-making process. For example, the APS silica gel can be mixed with bulk cellulose to form a cellulose pulp mixture. The mixture can be then formed into filter paper according to methods known in the art.

Figure 3:
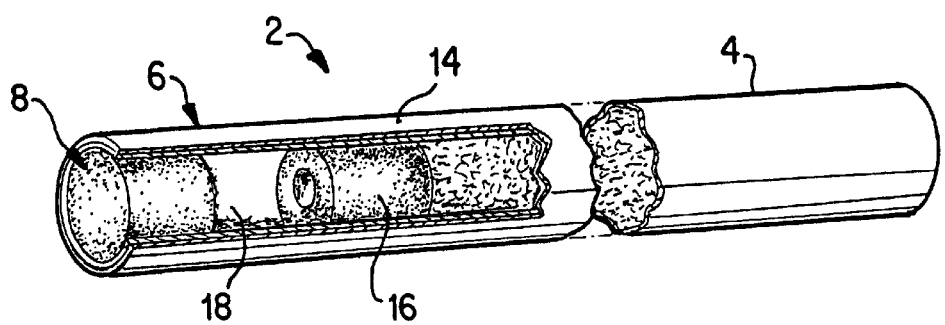
FIG. 3 is a perspective partially exploded view of another embodiment of the present invention wherein the reagent is incorporated in a plug-space-plug filter element.

In another preferred embodiment of the present invention, the reagent such as APS silica gel is incorporated into the fibrous material of the cigarette filter portion itself. Such filter materials include, but are not limited to, fibrous filter materials including paper, cellulose acetate fibers, and polypropylene fibers. This embodiment is illustrated in FIG. 3, which shows a cigarette 2 comprised of a tobacco rod 4 and a filter portion 6 in the form of a plug-space-plug filter having a mouthpiece filter 8, a plug 16, and a space 18. The plug 16 can comprise a tube or solid piece of material such as polypropylene or cellulose acetate fibers. The tobacco rod 4 and the filter portion 6 are joined together with tipping paper 14. The filter portion 6 may include a filter overwrap 11. The filter overwrap 11 contains traditional fibrous filter material and reagent such as APS silica gel can be incorporated in or on the filter overwrap 11 such as by being coated thereon. Alternatively, the APS silica gel can be incorporated in the mouthpiece filter 8, in the plug 16, and/or in the space 18. Moreover, the APS silica gel can be incorporated in any element of the filter portion of a cigarette. For example, the filter portion may consist only of the mouthpiece filter 8 and the APS silica gel can be incorporated in the mouthpiece filter 8 and/or in the tipping paper 14.

Figure 4:
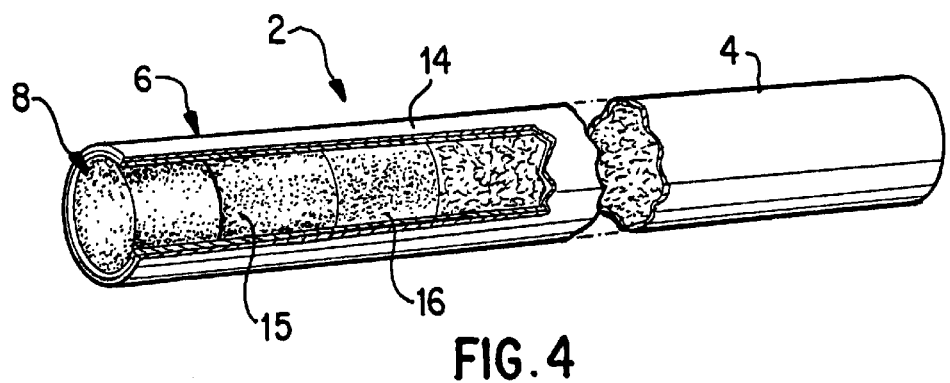
FIG. 4 is a perspective partially exploded view of another embodiment of the present invention wherein the reagent is incorporated in a three-piece filter element having three plugs.

FIG. 4 shows a cigarette 2 comprised of a tobacco rod 4 and filter portion 6. This arrangement is similar to that of FIG. 3 except the space 18 is filled with granules of APS silica gel or a plug 15 made of material such as fibrous polypropylene or cellulose acetate containing APS silica gel. As in the previous embodiment, the plug 16 can be hollow or solid and the tobacco rod 4 and filter portion 6 are joined together with tipping paper 14. There is also a filter overwrap 11.

Figure 5:
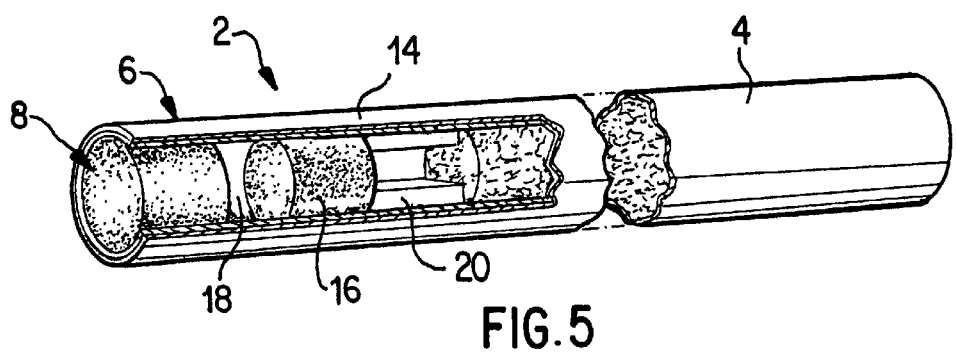
FIG. 5 is a perspective partially exploded view of another embodiment of the present invention wherein the reagent is incorporated in a four-piece filter element having a plug-space-plug arrangement and a hollow sleeve.

FIG. 5 shows a cigarette 2 comprised of a tobacco rod 4 and a filter portion 6 wherein the filter portion 6 includes a mouthpiece filter 8, a filter overwrap 11, tipping paper 14 to join the tobacco rod 4 and filter portion 6, a space 18, a plug 16, and a hollow sleeve 20. The APS silica gel can be incorporated into one or more elements of the filter portion 6. For instance, the APS silica gel can be incorporated into the sleeve 20 or granules of the APS silica gel can be filled into the space within the sleeve 20. If desired, the plug 16 and sleeve 20 can be made of material such as fibrous polypropylene or cellulose acetate containing APS silica gel. As in the previous embodiment, the plug 16 can be hollow or solid.

Figure 6:
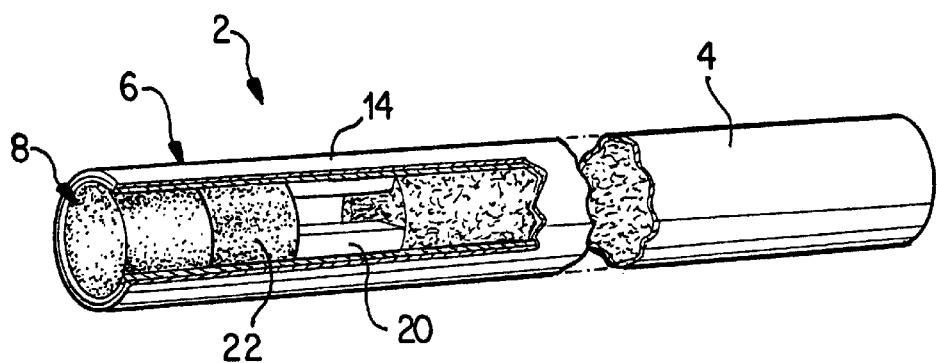
FIG. 6 is a perspective partially exploded view of another embodiment of the present invention wherein the reagent is incorporated in a three-part filter element having two plugs and a hollow sleeve.
Figure 7:
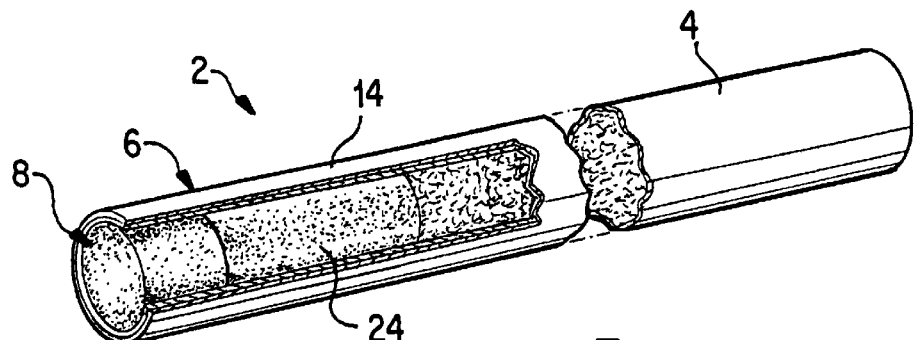
FIG. 7 is a perspective partially exploded view of another embodiment of the present invention wherein the reagent is incorporated in a two-part filter element having two plugs.

FIGS. 6 and 7 show further modifications of the filter portion 6. In FIG. 6, cigarette 2 is comprised of a tobacco rod 4 and filter portion 6. The filter portion 6 includes a mouthpiece filter 8, a filter overwrap 11, a plug 22, and a sleeve 20, and the APS silica gel can be incorporated in one or more of these filter elements. In FIG. 7, the filter portion 6 includes a mouthpiece filter 8 and a plug 24, and the APS silica gel can be incorporated in one or more of these filter elements. Like the plug 16, the plugs 22 and 24 can be solid or hollow. In the cigarettes shown in FIGS. 6 and 7, the tobacco rod 4 and filter portion 6 are joined together by tipping paper 14.

Various techniques can be used to apply the reagent such as APS silica gel to filter fibers or other substrate supports. For example, the APS silica gel can be added to the filter fibers before they are formed into a filter cartridge, e.g., a tip for a cigarette. The APS silica gel can be added to the filter fibers, for example, in the form of a dry powder or a slurry by methods known in the art. If the APS silica gel is applied in the form of a slurry, the fibers are allowed to dry before they are formed into a filter cartridge.

In another preferred embodiment, the reagent such as APS silica gel is employed in a hollow portion of a cigarette filter. For example, some cigarette filters have a plug/space/plug configuration in which the plugs comprise a fibrous filter material and the space is simply a void between the two filter plugs. That void can be filled with the APS silica gel of the present invention. An example of this embodiment is shown in FIG. 3. The APS silica gel can be in granular form or can be loaded onto a suitable support such as a fiber or thread.

Figure 8:
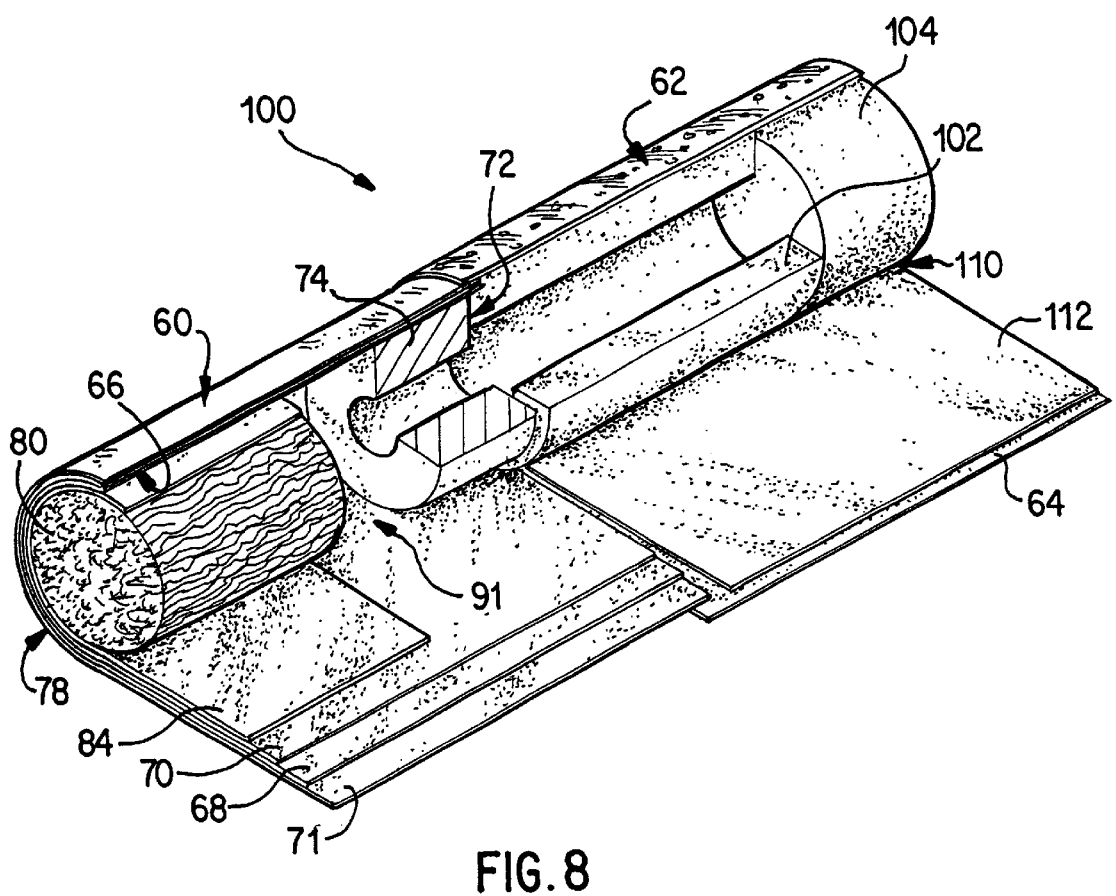
FIG. 8 is a perspective partially exploded view of another embodiment of the present invention wherein the reagent is incorporated in a filter element of a cigarette used with an electrical smoking device.

In another embodiment of the present invention, the reagent such as APS silica gel is employed in a filter portion of a cigarette for use with a smoking device as described in U.S. Pat. No. 5,692,525, the entire content of which is hereby incorporated by reference. FIG. 8 illustrates one type of construction of a cigarette 100 which can be used with an electrical smoking device. As shown, the cigarette 100 includes a tobacco rod 60 and a filter portion 62 joined by tipping paper 64. The filter portion 62 preferably contains a tubular free-flow filter element 102 and a mouthpiece filter plug 104. The free-flow filter element 102 and mouthpiece filter plug 104 may be joined together as a combined plug 110 with plug wrap 112. The tobacco rod 60 can have various forms incorporating one or more of the following items: an overwrap 71, another tubular free-flow filter element 74, a cylindrical tobacco plug 80 preferably wrapped in a plug wrap 84, a tobacco web 66 comprising a base web 68 and tobacco flavor material 70, and a void space 91. The free-flow filter element 74 provides structural definition and support at the tipped end 72 of the tobacco rod 60. At the free end 78 of the tobacco rod 60, the tobacco web 66 together with overwrap 71 are wrapped about cylindrical tobacco plug 80. Various modifications can be made to a filter arrangement for such a cigarette incorporating the reagent of the invention.

In such a cigarette, the reagent such as APS silica gel can be incorporated in various ways such as by being loaded onto paper or other substrate material which is fitted into the passageway of the tubular free-flow filter element 102 therein. It may also be deployed as a liner or a plug in the interior of the tubular free-flow filter element 102. Alternatively, the reagent such as APS silica gel can be incorporated into the fibrous wall portions of the tubular free-flow filter element 102 itself. For instance, the tubular free-flow filter element or sleeve 102 can be made of suitable materials such as polypropylene or cellulose acetate fibers and the reagent such as APS silica gel can be mixed with such fibers prior to or as part of the sleeve forming process.

In another embodiment, the reagent such as APS silica gel can be incorporated into the mouthpiece filter plug 104 instead of in the element 102. However, as in the previously described embodiments, according to the invention, the reagent such as APS silica gel may be incorporated into more than one component of a filter portion such as by being incorporated into the mouthpiece filter plug 104 and into the tubular free-flow filter element 102.

The filter portion 62 of FIG. 8 can also be modified to create a void space into which the reagent such as granular APS silica gel can be inserted.

As explained above, the APS silica gel can be incorporated in various support materials. When the APS silica gel is used in filter paper, the silica gel beads or particles may have an average particle diameter of 10 to 100 μm, preferably 40 to 50 μm. When the APS silica gel is used in filter fibers or other mechanical supports, larger silica gel particles may be used. Such particles preferably have a mesh size from 25 to 60, and more preferably from 35 to 60 mesh. The silica gel particles preferably have an average pore size of about 40 to about 250 Å, and more preferably, about 150 Å.

The amount of APS silica gel employed in the cigarette filter by way of incorporation on a suitable support such as filter paper and/or filter fibers depends on the amount of aldehydes in the tobacco smoke and the amount of aldehydes desired to be removed. As an example, the filter paper and the filter fibers may contain from 10% to 50% by weight of the APS silica gel.

Any commercially available APS silica gel such as that available from J.T. Baker Chemical Co., Philipsburg, N.J., can be used in the present invention. It should be noted that the J.T. Baker product is "capped." This means that the free silica gel surface, i.e., the surface that has not been covalently bonded to the APS silica gel groups, is made to be non-polar by coverage with hydrophobic groups.

The APS silica gel can also be made, for example, by mixing aminopropyltriethoxysilane, more preferably 3-aminopropyltriethoxysilane, with silica gel in a water and ethanol solvent. Other solvents, such as toluene, can also be used. The mixture is heated for several hours to allow the 3-aminopropyltriethoxysilane to react with and chemically bond to the silica gel surface. The reaction mixture is then decanted to obtain a reaction product comprising the APS silica gel. The reaction product is subsequently rinsed with a solvent, and dried in an oven at an elevated temperature such as around 100° C. or above. Although the rinsing and drying steps are optional, the drying step is preferred. Unlike the J.T. Baker product, the APS silica gel made by this method is not "capped."

The above paragraph describes a process routine which may be practiced with other aminopropyltrialkoxysilanes, such as 3-aminopropyltrimethoxysilane.

The APS silica gel can also be prepared by the following more specific procedure. A suspension of the chosen silica gel is rapidly stirred in a solution of water and ethanol. To that mixture is added a 3-aminopropyltrialkoxysilane compound, preferably 3-aminopropyltriethoxysilane. The 3-aminopropyltrialkoxysilane can be added before, during, or after heating. The 3-aminopropyltrialkoxysilane is preferably pre-diluted with anhydrous ethanol. The resulting mixture is then heated, preferably to the boiling point. In the most preferred embodiments, the ethanol is distilled off and replaced with water. The solids are isolated by a procedure such as filtration and with an optional solvent rinse, preferably water. The solids are then heated in an oven until water loss has proceeded to equilibrium with the surroundings. Typical embodiments entail heating overnight at about 105° C.

Figure 9:
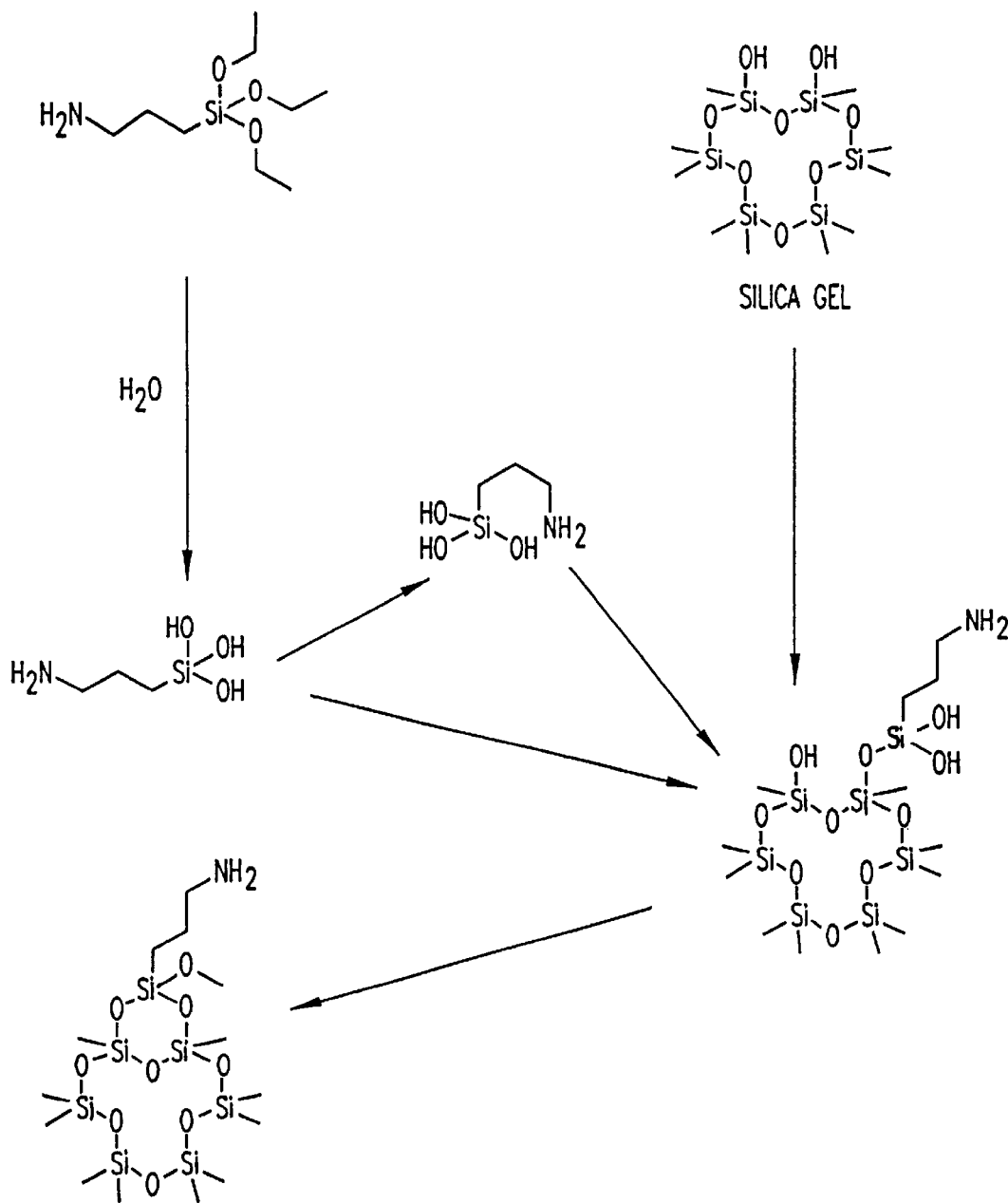
FIG. 9 depicts the chemical structures of the starting materials, the intermediate products, and the final APS silica gel reagent of a representative process for preparing the reagent used in the invention.

FIG. 9 depicts the most likely mechanism of the reaction that occurs in the making of APS silica gel when 3-aminopropyltriethoxysilane and silica gel are used as the starting materials. This mechanism is also applicable to other 3-aminopropyltrialkoxysilanes. As shown, when 3-aminopropyltriethoxysilane is contacted with water under appropriate conditions, the ethoxy groups are replaced with hydroxyl so that a 3-aminopropyltrihydroxysilane intermediate is obtained. That intermediate is also believed to undergo a conformational change (which stabilizes the monomeric form sufficiently to allow it to be used in aqueous medium) before reacting with the silica gel, as shown in FIG. 9. FIG. 9 further shows the structure of the intermediate reaction product of 3-aminopropyltrihydroxysilane and silica gel. FIG. 9 finally shows the cross-linked APS silica gel product after curing. The curing causes the loss of hydroxyl groups to result in at least a doubly linked silicon anchor for the reactive group.

As shown in FIG. 9, each silicon atom of silica gel is tetrahedrally coordinated by four oxygen atoms, which are either singly bonded to two silicon atoms or to a silicon and a proton (OH). The size of the ring can vary, but is typically about 150 Å.

The 3-aminopropyltriethoxysilane can be obtained commercially from Dow Corning Corp. The silica gel can be obtained commercially from the Grace Davison Division of W.R. Grace & Co.

EXPERIMENTAL EXAMPLES

Preparation of APS Silica Gel Material

Grace Davison 646 (35×60 Mesh, 150-angstrom pore size) Silica Gel (circa 1700 to 2000 grams) was placed into a 12-liter Pyrex glass kettle. Distilled water (4 liters) and 95% ethanol (2 liters; 100% ethanol is also acceptable) was added. A clamp-on head had a central neck for the stirring-rod, and three peripheral necks for reagent addition and vapor exit. A stainless steel paddle stirrer was attached to a high-torque (50 inch-pound) digitally controlled stirrer. The high torque stirrer needed to be double-clamped to a sturdy rack system, and served as the point of reference with respect to the kettle. The latter was raised and lowered by a system of "Lab-Jacks," and positioned precisely with respect to the fixed stirrer-rod. The stirrer blade needs to be fairly close to the kettle bottom, but not touching. The blade must never touch the bottom even during "bumping" induced rebound of the flask/kettle. The flask needs to be restrained to prevent motion during "bumping," which is unavoidable, but which the stirring minimizes. A plastic bearing was found to be advantageous since stainless steel bearings were found to be prone to seizing up, and glass bearings were prone to breakage. The mixture was stirred at 200 to 300 RPM, and heated (12 liter mantle, dual heating zone, 100 volts each zone). 3-aminopropyltriethoxysilane (1×500 gram bottle), diluted with 100% ethanol (1 liter, including the rinsings) was added as quickly as possible to the stirred heated mixture. (Higher levels of APS functional group incorporation could be achieved by increasing the amount of reagent used).

The ethanol was distilled off. When about 2 liters of aqueous ethanol distillate had collected, water (2 liters) was added to the reaction to restore the original volume. Two more liters of distillate were collected, and two more liters of replacement water were added. The heating was shut off, and stirring was continued until bumping ceased. The mixture was left to cool overnight. The apparatus was dismantled, and the silica was swirled manually and dumped into 4 liter plastic beakers, using recycled supernatant liquid to complete the removal of solids. The solids were filtered off onto large (18 to 24 cm diameter) Buchner funnels, with minimal water rinsing (a few hundred milliliters at most). After suction had removed most of the liquid, the moist solids were transferred to stainless steel trays, to dry overnight at 105° C. in an oven.

Depending on the amount of 3-aminopropyltriethoxysilane employed, relative to the starting silica gel, the dried products showed nominal weight gains ranging from about 8% to about 24%. One of the batches used in the examples below was prepared from 1692.4 grams of Grace Division Silica Gel 646 and 500.1 grams of 3-aminopropytrietoxysilane under the general conditions described above. After drying, 1891 grams of APS silica was obtained. A sample was analyzed for C, H, and N. Found: C, 4.21%; H, 1.37%; N, 1.58%. Based on the nitrogen analysis, the 3-aminopropyl content of the silica was 6.55% by weight of product total.

Cigarette Testing

Several tests were conducted to determine the ability of the cigarette filter of the present invention to remove aldehydes from tobacco smoke as compared to conventional devices. The tests measured the amount of aldehydes removed from the wholestream smoke after the cigarette was fully smoked. WS represents the amount, in %, of aldehydes removed from the wholestream smoke after all the smoke has been collected and analyzed. TPM represents the amount, in mg/cigarette, of particulate material collected in the filter portion of the cigarette.

In the following tests, the silica gels used showed a nominal weight gain of about 8 to 25% from the original silica gel during the manufacturing process outlined above. Based on the tests below, a preferred weight gain is around 8 to 16, preferably 10 to 15 wt. %. It is important to note that this weight gain does not refer to weight gain as a result of removing aldehydes. It refers to weight gain from the reaction that adds functional groups such as APS functional groups to the silica gel. APS silica gels that are especially effective when employed in accordance with this invention exhibit a nitrogen content preferably in the range of about 1 to 3 percent by weight, and more preferably in the range of about 1.5 to about 2.1 percent.

Example 1

Filter sections of cigarettes were constructed in accordance with FIG. 1 and with the tobacco rod section of FIG. 8. A filter section constructed in accordance with the invention identified as Sample 2 contained 16.5 mg of APS silica gel on a folded piece of filter paper 10 (17 mm×23 mm) inserted in the hollow portion of the tubular filter 12. Another filter section constructed in accordance with the invention identified as Sample 3 contained 21 mg of APS silica gel on a folded piece of filter paper 10 (22 mm×23 mm) inserted into the hollow portion of the tubular filter 12. A comparative filter section using a folded piece of the filter paper (17 mm×23 mm) paper (without any APS silica gel) fitted into the hollow portion of the tubular filter was constructed as a control and identified as Sample 1. For Samples 2 and 3, 15 cigarettes were made for TPM measurements and 9 were made for WS measurements. For control Sample 1, 15 cigarettes were made for TPM measurements and 15 for WS measurements. The results are shown in Table 1 below.

TABLE 1

| SAMPLE | TPM | WS |
|---|---|---|
| 1 Control | 2.85 | |
| 2 16.5 mg reagent | 2.83 | ~61% |
| 3 21.0 mg reagent | 3.11 | ~78% |

Example 2

Cigarettes similar to those tested in Example 1 included a shorter section containing the APS silica gel. In Samples 1–3, the filter section was constructed in accordance with FIG. 2 and included a 16 mm sleeve 13, a 7 mm sleeve 12, and a 7 mm filter plug 8. The sleeve 12 contained a folded sheet (7 mm×75 mm) of APS silica gel coated or uncoated paper. Three samples identified as control Sample 1 (uncoated paper), Sample 2 (paper coated with 11 mg APS silica gel), and Sample 3 (paper coated with 22 mg APS silica gel) were tested. 15 cigarettes of each sample were made for TPM measurement and 9 for WS measurement. The results are shown in Table 2 below.

TABLE 2

| SAMPLE | TPM | WS |
|---|---|---|
| 1 (Control) | 3.37 | |
| 2 11 mg reagent | 3.14 | ~69% |
| 3 22 mg reagent | 2.35 | ~78% |

Example 3

Cigarettes were constructed in accordance with a more conventional cigarette having a tobacco rod like that shown in FIG. 2 and a conventional filter element. Sample 1 is a control sample without APS silica gel and Sample 2 contained 50 mg APS silica gel in the filter element. The WS was measured for each and the results are shown in Table 3.

TABLE 3

| SAMPLE | WS |
|---|---|
| 1 Control | |
| 2 50 mg reagent | ~71% |

Example 4

Cigarettes were constructed in accordance with FIG. 8 having APS silica gel contained in the mouthpiece filter. Sample 1 is a control sample which did not include APS silica gel and Samples 2 and 3 contained APS silica gel in the mouthpiece filter 104 which was 7 mm long. The samples also included a sleeve 102 adjacent the mouthpiece filter which was 23 mm long and constructed of polypropylene. In Sample 3, 11 mg APS silica gel was included in an additional polypropylene sleeve 74 having a length of 7 mm and located in the tobacco rod at an end thereof adjacent the filter element. The WS was measured for each and the results are shown in Table 4.

TABLE 4

| SAMPLE | WS |
|---|---|
| 1 Control | |
| 2 Polypropylene mouthpiece filter with 12 mg reagent | ~46% |
| 3 Polypropylene mouthpiece filter with 11 mg reagent | ~41% |

Example 5

Cigarettes were constructed in accordance with FIG. 8 having APS silica gel contained in various filter elements. The cigarettes were tested for WS and TPM levels and the results are shown in Table 5 below.

TABLE 5

| SAMPLE | TPM | WS |
|---|---|---|
| 1 Control | | |
| 2 Polypropylene sleeve 102 with 40 mg reagent and second polypropylene sleeve 74 with 11 mg reagent | 5.88 | ~38% |
| 3 Polypropylene sleeve 102 with 40 mg reagent | 5.11 | ~35% |
| 4 Cellulose acetate sleeve 102 with 50 mg reagent | 4.71 | ~35% |
| 5 Polypropylene sleeve 102 with 25 mg reagent and 25 mg carbon | 5.73 | ~33% |

All samples had a 23 mm long sleeve 102 in the filter portion and a 7 mm long mouthpiece filter 104. In Sample 2, the second sleeve 74 containing the APS silica gel was located in the tobacco rod adjacent the filter portion and had an inner diameter of 4.0 mm. In Samples 3–5, a second sleeve 74 similar to that of Sample 2 but without the APS silica gel had an inner diameter of 3.5 mm.

Example 6

Cigarettes were constructed in accordance with the plug-space-plug embodiment shown in FIG. 5. In each cigarette, the tubular free-flow filter element 20 was 13 mm long, the filter plug 8 was 5 mm long, the filter plug 16 was 7 mm long, and the void space 18 was 5 mm long. Control Samples 1 and 3 contained 50 mg of silica gel without any APS silica gel in the void space 18 and Samples 2 and 4 included APS silica gel particles weighing 50 mg in the void space 18. WS was measured and the results are shown in Table 6 below.

TABLE 6

| SAMPLE | WS |
|---|---|
| 1 (Control) | ~50% |
| 2 | ~87% |
| 3 (Control) | ~78% |
| 4 | over 93% |

Example 7

The cigarettes used for Samples 2 and 3 in Table 7 below were constructed in accordance with the embodiments shown in FIGS. 6 and 7, respectively. In Sample 2, the tubular filter element 20 was 16 mm long, the filter plug 8 was 7 mm long, and the solid plug 22 was 7 mm long and comprised of a hand rolled mixture of APS silica gel and polypropylene fibers. In Sample 3, the plug 24 was 23 mm long and comprised of a hand rolled mixture of APS silica gel and polypropylene fibers and the filter plug 8 was 7 mm long. Sample 1 was a control cigarette. Measurements were made of TPM and WS. The results are shown in Table 7 below.

TABLE 7

| SAMPLE | TPM | WS |
|---|---|---|
| 1 | | |
| 2 | 3.92 | ~66% |
| 3 | Not tested | ~81% |

According to the invention, the surface of silica gel can be chemically modified to achieve desired selective filtration properties. In the case of APS silica gel, the aminopropylsilyl group is attached to the silica gel skeleton by one or more covalent silicon-oxygen-silicon bonds. The primary amine group at the terminal (exposed or free) end of the aminopropylsilyl group readily reacts with aldehydes and ketones. The primary amine reacts with the aldehyde to form an imine and/or other covalently bonded derivatives of the aldehyde. The imine group or other covalently bonded derivative of the aldehyde remains anchored to the silica gel and thus the formation of such derivatives serves to effectively remove the aldehydes and ketones and their reaction products from cigarette smoke. The primary amine group also reacts with hydrogen cyanide through an acid-base reaction thus reducing the levels of this compound in the cigarette smoke.

Figure 10:
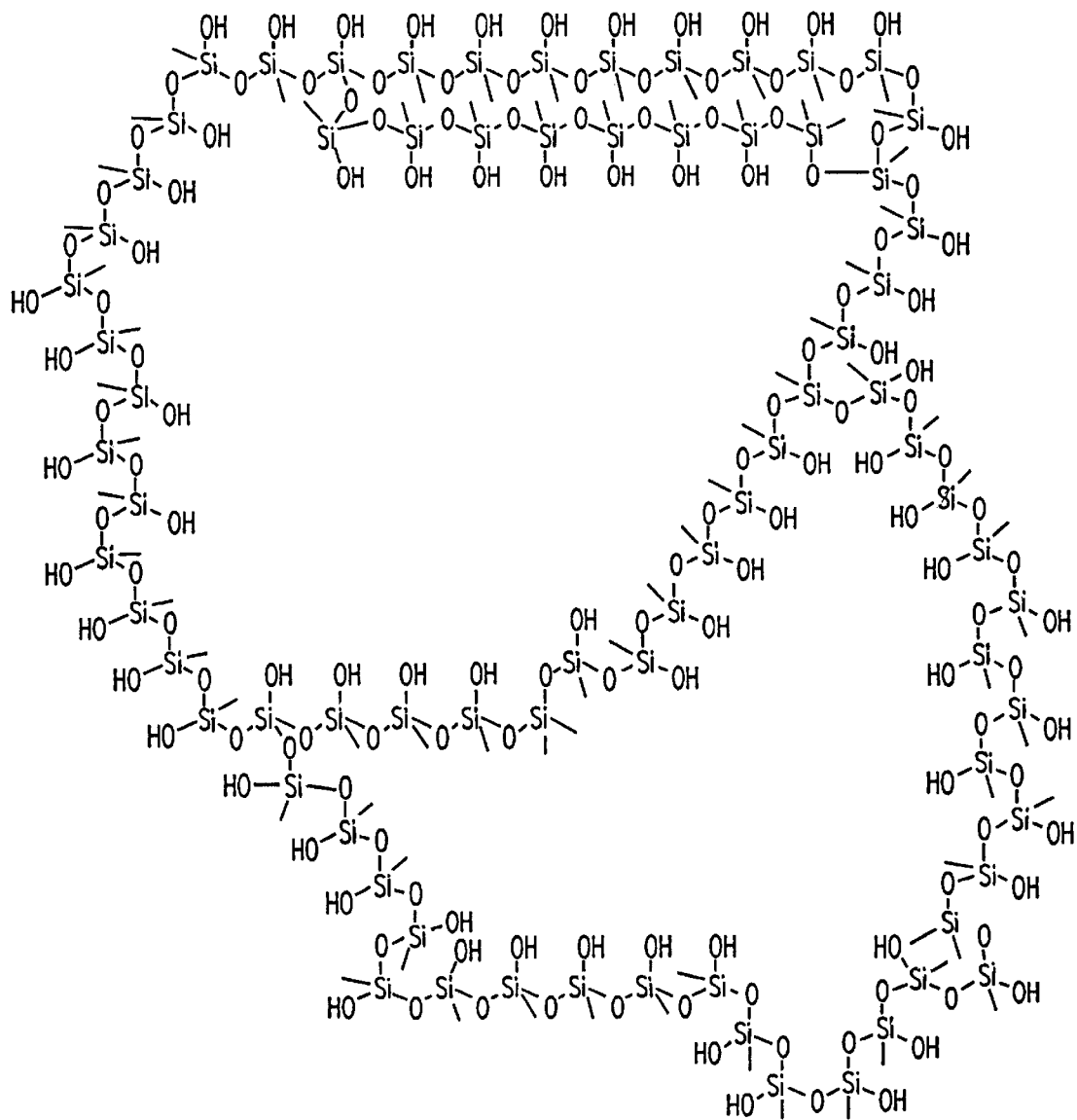
FIG. 10 shows a graphic representation of silica gel wherein the typical Si—O—Si bond angle is 145°, the Si—O bond length is about 1.62 Å and the typical Si—Si distance is about 3.06 Å.

Silica gel is a variably hydrous form of silicon dioxide sometimes called "silicic acid' which can be prepared by precipitation from an acid solution of sodium silicate. The silica gel can be characterized as a porous disordered three-dimensional polymer of siloxane tetrahedra, forming sheets, ribbons, chains and frameworks with various pore-sizes permeating the whole, formed by the variable nature of the cross-linking of the overall three-dimensional structure. Each silicon atom is bonded to four oxygen atoms, at the corners of a tetrahedron. The oxygen atoms are mostly bonded to two silicon atoms but some can be bonded to a single silicon atom and one hydrogen atom to generate a "silanol" functionality. The majority of oxygen atoms are "siloxane" oxygen atoms which are bonded to two silicon atoms. Some silicon atoms called "germinal" silanediols are bonded to two silanol oxygens. The vast majority of silanol groups consist of a silicon atom with one hydroxyl group and three siloxane oxygens. Such silanols may be isolated from one another but when adjacent each other are referred to as "vicinal" silanols (oxo-bis-silanols). Such silanol functionality provides a point of attachment for derivatizing groups such as 3-aminopropylsilyl. FIG. 10 shows a graphic representation of silica gel wherein the typical Si—O—Si bond angle is 145°, the Si—O bond length is about 1.62 Å and the typical Si—Si distance is about 3.06 Å.

Figure 11:
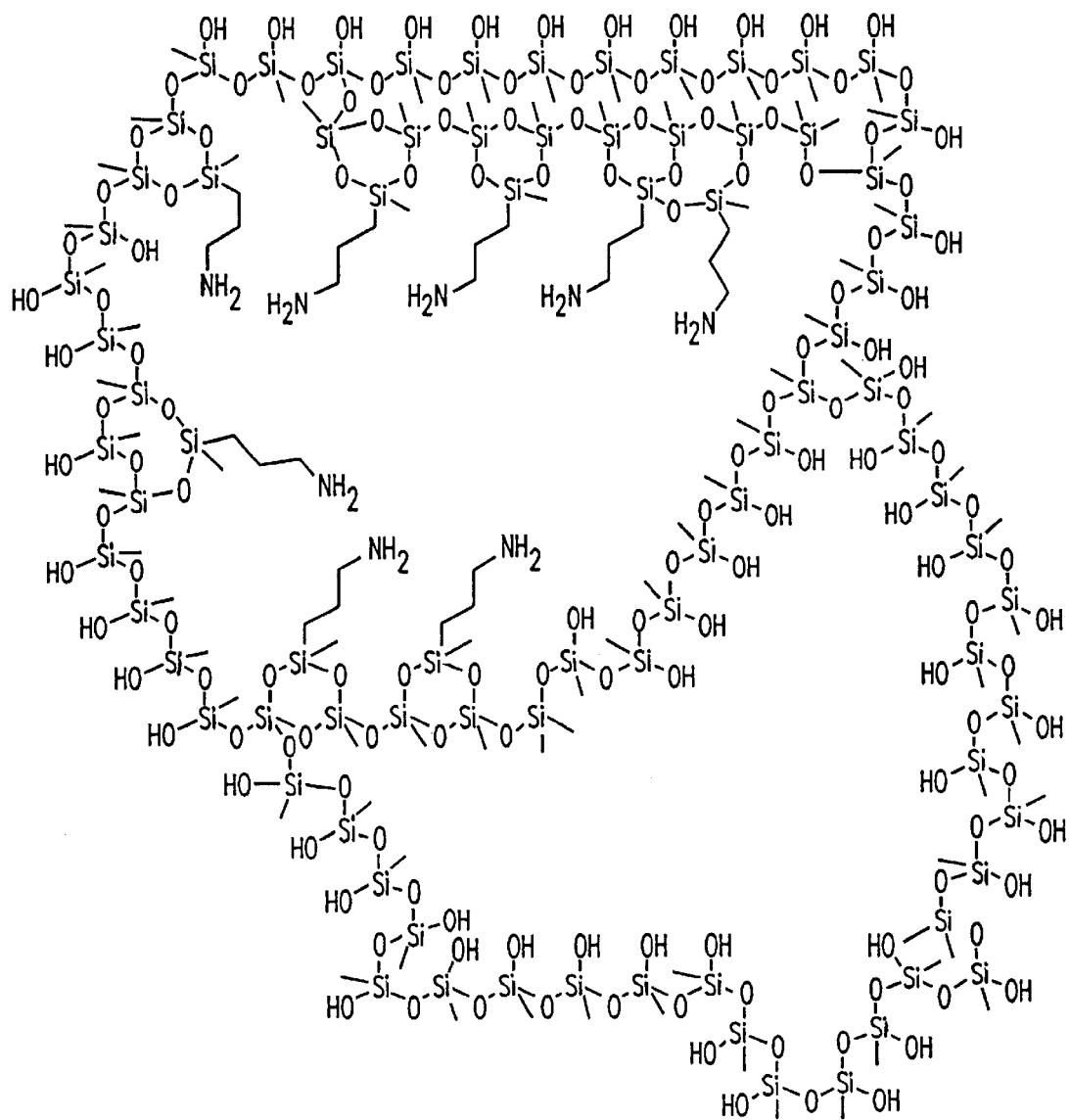
FIG. 11 shows a graphic representation of APS silica gel wherein the typical Si—O—Si bond angle is 145°, the Si—O bond length is about 1.62 Å and the typical Si—Si distance is about 3.06 Å.

APS silica gel can be characterized as silica gel which has been modified at some of the hydroxyl groups by the derivatizing reagent 3-aminopropyltriethoxysilane which permanently attaches 3-aminopropylsilyl (APS) groups to the porous silica gel framework. The attached 3-aminopropylsilyl groups can react with targeted carbonyl group containing substrates. FIG. 11 shows a graphic representation of APS silica gel wherein the typical Si—O—Si bond angle is 145°, the Si—O bond length is about 1.62 Å and the typical Si—Si distance is about 3.06 Å. The 3-aminopropylsilyl groups can be considered basic in that they can remove acids such as hydrogen cyanide from mainstream cigarette smoke. In preparing such APS silica gel it is preferred that the silica gel have a large average pore diameter. For instance, whereas "desiccant" silica gel has a pore size on the order of 20 Å, a preferred pore size for the APS silica gel is on the order of 60 to 150 Å. Large pore-sized silica gel can be obtained from the Davison Chemical Division of the W.R. Grace & Company, Baltimore, Md.

One technique for making such large pore-sized silica gel is by preparing a sodium silicate solution containing dilute sulfuric acid, allowing the solution to gel over time, washing with water (for several days), drying and grinding the silica gel. In converting the silica gel into APS silica gel, the silica gel of the desired particle size can be heated with the derivatizing reagent 3-aminopropyltriethoxysilane in a solvent such as water, ethanol, toluene or the like, and heat-drying the reaction product to "cure" the product. Any unused reagent can be recycled during production of other batches of APS silica gel.

Figure 12:
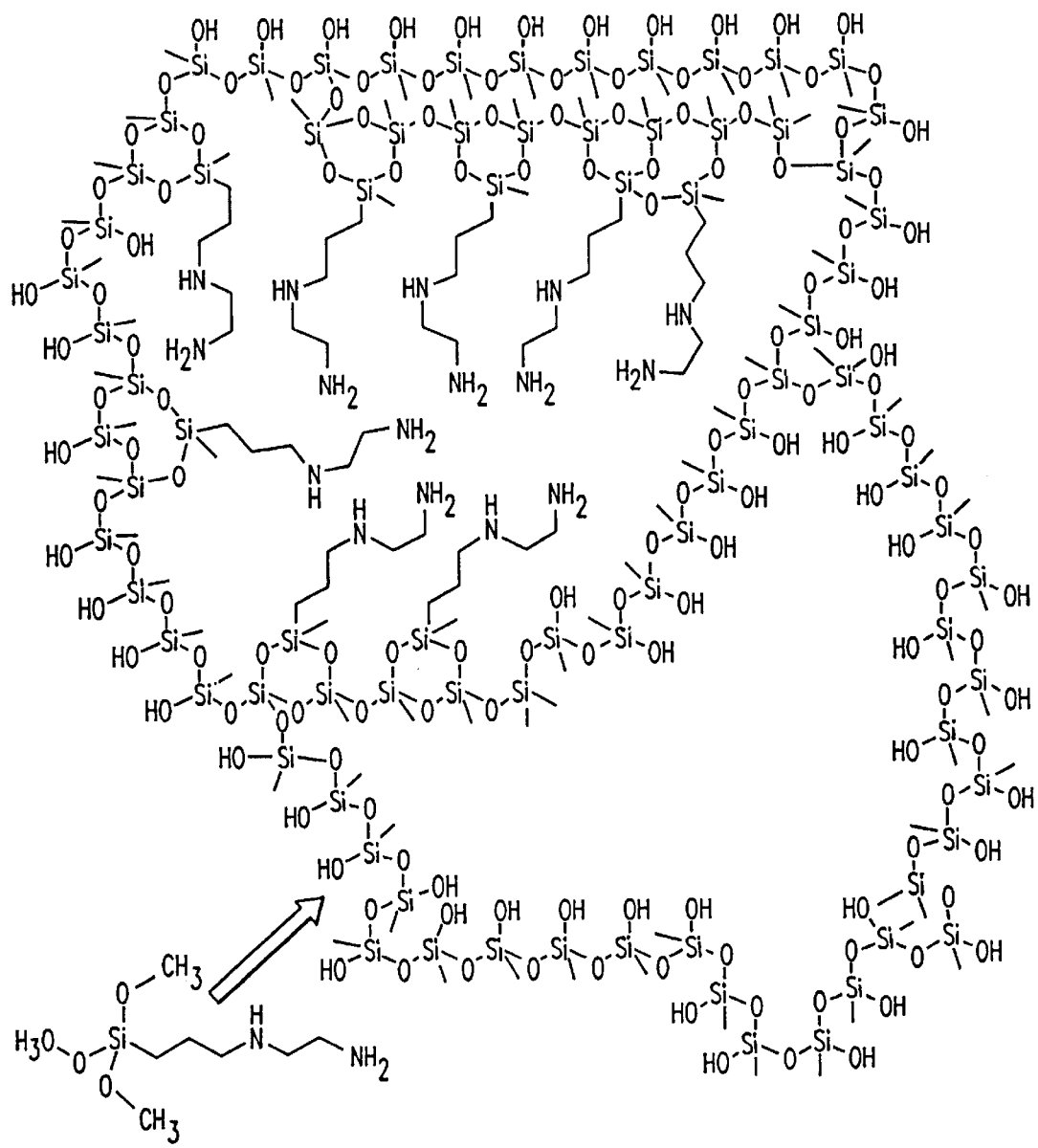
FIG. 12 depicts the chemical structures of the starting materials, the intermediate products, and the final AEAPS silica gel.
Figure 13:
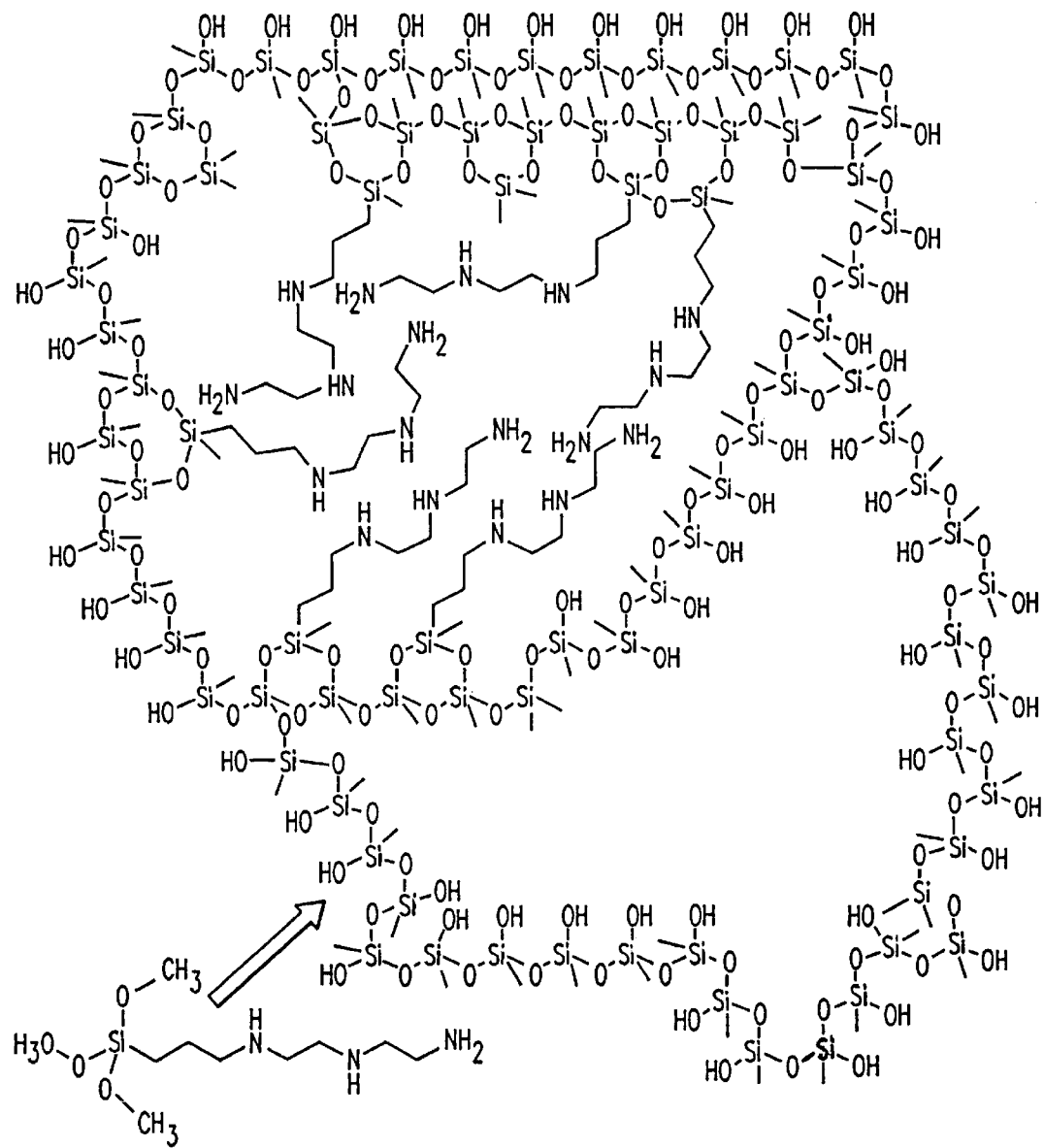
FIG. 13 depicts the chemical structures of the starting materials, the intermediate products, and the final AEAEAPS silica gel.

The APS silica gel can be prepared using other derivatizing reagents. For instance, another derivatizing reagent which can be used is 3-aminopropyltrimethoxysilane which generates methanol during the manufacturing process. In contrast, 3-aminopropyltriethoxysilane generates ethanol. In addition, the silica gel can be modified to incorporate groups in addition to or instead of the APS. For example, the silica gel can be modified to form aminoethylaminopropylsilyl (AEAPS) silica gel which can be made using N-[3-(trimethoxysilyl)propyl]-ethylenediamine (Chemical Abstracts Service Registry No. 1760-24-3) as the derivatizing reagent. FIG. 12 depicts the chemical structures of the starting materials, the intermediate products, and the final AEAPS silica gel. Alternatively, the silica gel can be modified to form aminoethylaminoethylaminopropylsilyl (AEAEAPS) silica gel which can be made using $N^1$-[3-(trimethoxysilyl)propyl]-diethylenetriamine (Chemical Abstracts Service Registry No. 35141-30-1) as the derivatizing reagent. FIG. 13 depicts the chemical structures of the starting materials, the intermediate products, and the final AEAEAPS silica gel. The above described APS, AEAPS and AEAEAPS surface modified silica gels can be made in commercial quantities by economic manufacturing conditions. It is contemplated that any covalently bonded amine group attached to silica such as homologues or analogues with additional amine functionality can also be used as a component of an air filter such as a cigarette filter in accordance with the invention.

Figure 14:
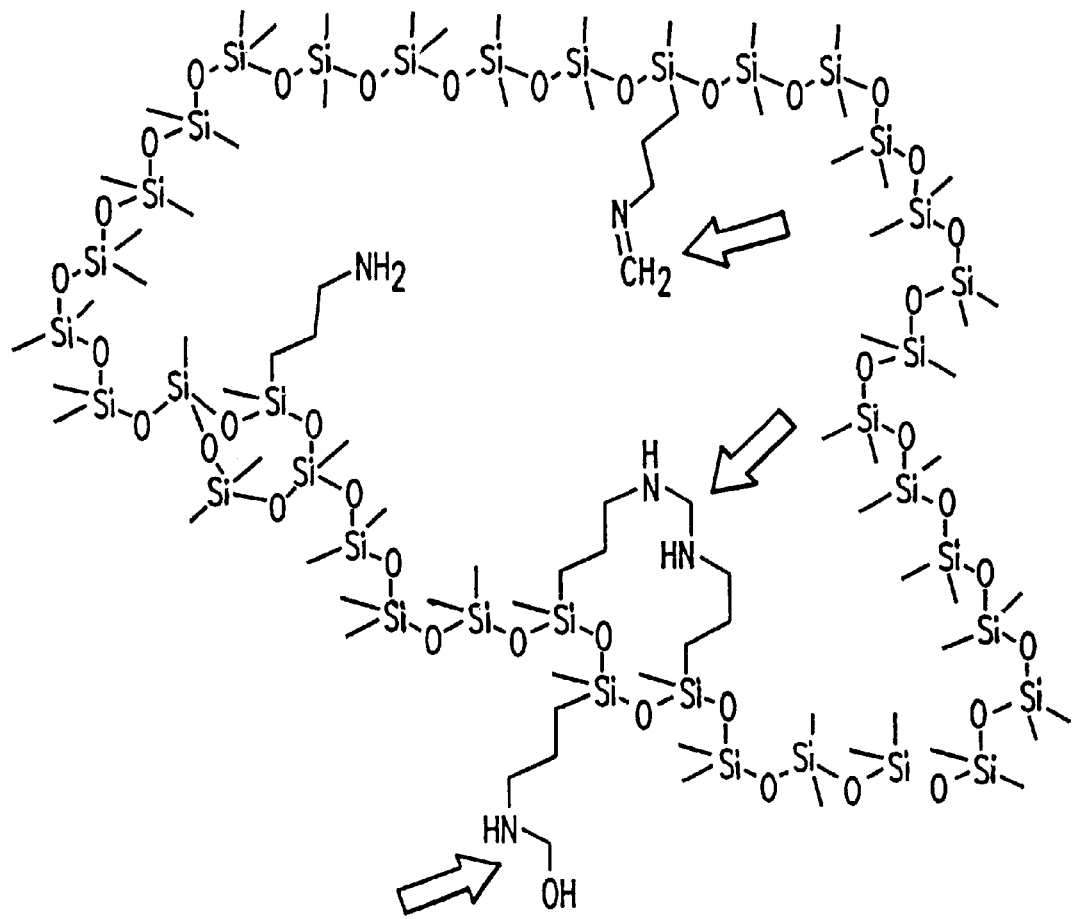
FIG. 14 shows a chemical formula representation of how the formaldehyde can be chemically bonded to the APS silica gel when cigarette smoke comes into contact with the APS silica gel.

During filtration, the APS silica gel can permanently remove select gaseous components from an airstream such as mainstream tobacco smoke. For instance, by incorporating the APS silica gel in a cigarette filter, cigarette paper, tobacco filler and/or tobacco containing sheet material of a cigarette, the APS silica gel can be used to selectively remove formaldehyde from tobacco smoke. FIG. 14 shows a chemical formula representation of how the formaldehyde can be chemically bonded to the APS silica gel when cigarette smoke comes into contact with the APS silica gel.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto. For example, the ring structure depicted in FIG. 9 is representative of a wide range of ring sizes present within the highly disordered silica gel structure, and is not intended to exclude other sizes of ring from consideration as components of the matter covered by this patent application.

What is claimed is:

1. A cigarette filter comprising a reagent consisting essentially aminoethylaminopropylsilyl silica gel or aminoethylaminoethylaminopropylsilyl silica gel wherein the reagent chemically reacts with a gaseous component of a smoke stream to remove said gaseous component from said smoke stream.

2. The cigarette filter according to claim 1, wherein the filter is attached to a tobacco rod by tipping paper or the reagent is incorporated in one or more cigarette filter parts selected from the group consisting of tipping paper, shaped paper insert, a plug, a space, or a free-flow sleeve.

3. The cigarette filter according to claim 1, wherein the reagent comprises particles or a shaped article of silica gel.

4. The cigarette filter according to claim 1, wherein the gaseous component to be removed from said smokestream is polar such as an aldehyde.

5. The cigarette filter according to claim 1, wherein said reagent is incorporated in cigarette filter paper located within a free-flow filter, the filter paper optionally having a three-dimensional shape and/or the filter paper being a liner on the interior of a hollow tubular element.

6. The cigarette filter according to claim 1, wherein said reagent is incorporated with cellulose acetate fibers and/or polypropylene fibers forming a plug or a free-flow filter element.

7. The cigarette filter according to claim 1, wherein said reagent is incorporated in a cavity or said reagent is incorporated in at least one of a mouthpiece filter plug and a tubular filter element adjacent to said mouthpiece filter plug or said reagent is incorporated in at least one of a mouthpiece filter plug, a first tubular filter element adjacent to said mouthpiece filter plug, and a second tubular filter element adjacent to the first tubular element or said reagent is incorporated in at least one part of a three-piece filter including a mouthpiece filter plug, a first filter plug adjacent to said mouthpiece filter plug, and a second filter plug adjacent to the first filter plug.

8. The cigarette filter according to claim 1, wherein said silica gel has an average particle diameter of 10 to 50 $\mu$m or said silica gel is in the form of 25 to 60 mesh particles.

9. The cigarette filter according to claim 1, wherein said reagent is incorporated in a cavity or said reagent is incorporated in at least one of a mouthpiece filter plug and a tubular filter element adjacent to said mouthpiece filter plug or said reagent is incorporated in at least one of a mouthpiece filter plug, a first tubular filter element adjacent to said mouthpiece filter plug, and a second tubular filter element adjacent to the first tubular element or said reagent is incorporated in at least one part of a three-piece filter including a mouthpiece filter plug, a first filter plug adjacent to said mouthpiece filter plug, and a second filter plug adjacent to the first filter plug.

10. The cigarette filter according to claim 1, wherein the total nitrogen content of said silica gel is in the range of approximately 1 to 3 percent by weight, preferably 1.5 to 2.1 percent by weight.

11. The cigarette filter according to claim 1, wherein the reagent is prepared by reacting silica gel with an aqueous or non-aqueous solution containing N-[3-(trimethoxysilyl)propyl]-ethylenediamine or $N^1$-[3-(trimethoxysilyl)propyl]-diethylenetriamine.

12. A method of manufacturing a cigarette filter which is useful for removing a gaseous component of tobacco smoke, comprising steps of:
preparing a reagent consisting essentially of aminoethylaminopropylsilyl silica gel or aminoethylaminoethylaminopropylsilyl silica gel; and
incorporating the reagent in a cigarette filter wherein the reagent chemically reacts with a gaseous component of tobacco smoke to remove said gaseous component from said gas mixture.

13. The method according to claim 12, further comprising attaching the cigarette filter to a tobacco rod with tipping paper or the reagent is incorporated in one or more cigarette filter parts selected from the group consisting of tipping paper, shaped paper insert, a plug, a space, or a free-flow sleeve.

14. The method according to claim 13, further comprising a step of attaching the filter paper within a free-flow filter of a cigarette such as by forming said filter paper into a three-dimensional shape or attaching said filter paper as a liner on the interior of a hollow tubular element or combining said reagent with fibers and forming a filter element from said reagent and fibers or combining said reagent with cellulose and/or polypropylene fibers and forming a plug or free-flow filter element or incorporating said reagent in a cavity of said filter.

15. The method according to claim 12, further comprising a step of incorporating said reagent in at least one of a mouthpiece filter plug and a tubular filter element adjacent to said mouthpiece filter plug or incorporating said reagent in at least one of a mouthpiece filter plug, a first tubular filter element adjacent to said mouthpiece filter plug, and a second tubular filter element adjacent to the first tubular element or incorporating said reagent in at least one part of a three-piece filter including a mouthpiece filter plug, a first filter plug adjacent to said mouthpiece filter plug, and a second filter plug adjacent to the first filter plug.

16. The method according to claim 12, wherein said silica gel has an average particle diameter of at least 10 $\mu$m or said silica gel is in the form of particles having a mesh size of at least 60.

17. The method according to claim 12, wherein the silica gel is in the form of particles, the method further comprising a step of loading the silica gel particles on filter fibers or other mechanical supports, said silica gel particles having a mesh size of at least 60 and an average pore size of about 40 to about 250 Å or the silica gel comprises beads or particles, the method further comprising a step of incorporating the silica gel beads or particles in a support material, the silica gel beads or particles having an average particle diameter of at least 10 $\mu$m.

18. The method according to claim 12, wherein the reagent is prepared by reacting silica gel with an aqueous or non-aqueous solution containing N-[3-(trimethoxysilyl)propyl]-ethylenediamine or $N^1$-[3-trimethoxysilyl)propyl]-diethylenetriamine.

19. A method of removing a gaseous component of tobacco smoke, comprising passing the tobacco smoke in contact with a cigarette filter comprising a reagent consisting essentially of aminoethylaminopropylsilyl silica gel or aminoethylaminoethylaminopropylsilyl silica gel which chemically reacts with the gaseous component of the tobacco smoke and removes said gaseous component from said tobacco smoke.

20. The method according to claim 19, further comprising steps of burning tobacco and directing a gas stream containing the tobacco smoke through the cigarette filter such that the component of the tobacco smoke to be removed is chemically reacted with the reagent and prevented from reentering the gas stream.

21. The method according to claim 19, wherein the reagent is incorporated in one or more cigarette filter parts selected from the group consisting of filter paper, tipping paper, shaped paper insert, a plug, a space, or a free-flow sleeve, the tobacco smoke being passed through the one or more filter parts.

22. The method according to claim 19, wherein the reagent is effective to remove formaldehyde from the tobacco smoke.

23. The method according to claim 19, wherein the reagent comprises particles or a shaped article, the tobacco smoke being passed through a mass of the particles or through the shaped article.

24. The method according to claim 19, wherein the cigarette filter removes a polar gaseous component such as a aldehyde.

25. The method according to claim 19, wherein said silica gel has an average particle diameter of at least 10 $\mu$m or said silica gel is in the form of particles having a mesh size of at least 60 and said tobacco smoke is passed through a mass of particles of said silica gel.

26. The method according to claim 19, wherein said silica gel is incorporated with cellulose acetate fibers and/or polypropylene fibers and the tobacco smoke is a smoke stream from a burning cigarette.

27. The method according to claim 19, wherein the cigarette filter includes a space containing loose granules of said silica gel and the tobacco smoke passes through said loose granules or said silica gel is loaded on a support material and said tobacco smoke flows in contact with said silica gel loaded on said support material.

28. The method according to claim 19, wherein the cigarette filter is part of a mouthpiece filter plug, a tubular filter element, a solid plug, or an open space, said tobacco smoke being passed through said filter.

29. The method according to claim 19, wherein said tobacco smoke is passed through paper containing or coated with said silica gel or the tobacco smoke is passed through a cigarette filter comprising fiber loaded with the silica gel.

30. The method according to claim 19, wherein the silica gel is in the form of particles on filter fibers or other mechanical supports, said particles having a mesh size of at least 60 and an average pore size of about 40 to about 250 Å, the tobacco smoke being passed through the cigarette filter containing the silica gel particles and the fibers or other mechanical supports.

31. The method according to claim 19, wherein the silica gel comprises beads or particles incorporated in a support material, the silica gel beads or particles having an average particle diameter of at least 10 $\mu$m, the tobacco smoke being passed through the cigarette filter containing the silica gel beads or particles.

32. The method according to claim 19, further comprising steps of loading the silica gel onto fibrous material forming an air permeable cigarette filter body.

33. The method according to claim 19, wherein the reagent is covalently bonded to cigarette filter fibers in an amount of 10 to 50% by weight.

34. The method according to claim 19, wherein the reagent is prepared by reacting silica gel with an aqueous or non-aqueous solution containing N-[3-(trimethoxysilyl)propyl]-ethylenediamine or $N^1$-[3-(trimethoxysilyl)propyl]-diethylenetriamine.

* * * * *